United States Patent
Ushiwata et al.

(10) Patent No.: US 8,061,250 B2
(45) Date of Patent: Nov. 22, 2011

(54) MITER SAW HAVING CIRCULAR SAW BLADE SECTION PIVOTALLY MOVABLE UPWARD AND DOWNWARD AND TILTABLE LEFTWARD AND RIGHTWARD

(75) Inventors: Shigeharu Ushiwata, Hitachinaka (JP); Takamoto Horiuchi, Hitachinaka (JP); Ryuichi Imamura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 11/078,489

(22) Filed: Mar. 14, 2005

(65) Prior Publication Data

US 2005/0235791 A1    Oct. 27, 2005

(30) Foreign Application Priority Data

Mar. 26, 2004   (JP) ................ P2004-092737

(51) Int. Cl.
*B27B 5/20* (2006.01)
(52) U.S. Cl. .......... 83/471.3; 83/473; 83/477.1; 83/581
(58) Field of Classification Search ............. 83/471.3, 83/473, 490, 477.1, 486.1, 581, 699.61, 167, 83/522.15, 472, 100, 485–487, 471.2; 144/252.1, 144/216, 217
See application file for complete search history.

(56) References Cited

U.S. PATENT DOCUMENTS

| | | | |
|---|---|---|---|
| 4,537,105 A * | 8/1985 | Bergler ................ | 83/471.3 |
| 5,189,937 A | 3/1993 | Garuglieri | |
| 5,239,906 A * | 8/1993 | Garuglieri ................ | 83/471.3 |
| 5,392,678 A * | 2/1995 | Sasaki et al. ............ | 83/471.3 |
| 5,421,228 A * | 6/1995 | Fukinuki ................ | 83/471.3 |
| 5,425,294 A | 6/1995 | Ushiwata | |
| 5,819,624 A * | 10/1998 | Brault et al. ............ | 83/471.3 |
| 5,823,085 A * | 10/1998 | Kondo et al. ............ | 83/471.3 |
| 5,862,732 A * | 1/1999 | Itzov ................ | 83/471.3 |
| 5,957,021 A * | 9/1999 | Meredith et al. ............ | 83/397 |
| 6,035,754 A * | 3/2000 | Stumpf et al. ............ | 83/471.3 |
| 6,918,330 B2 * | 7/2005 | Ng et al. ................ | 83/471.3 |
| 6,988,435 B2 * | 1/2006 | Kao ................ | 83/100 |
| 2003/0056632 A1 | 3/2003 | Ng et al. | |
| 2003/0226436 A1 * | 12/2003 | Higuchi ................ | 83/471.3 |
| 2004/0089125 A1 * | 5/2004 | Schoene et al. ............ | 83/471.3 |
| 2005/0193881 A1 * | 9/2005 | Liao et al. ................ | 83/478 |

FOREIGN PATENT DOCUMENTS

| | | |
|---|---|---|
| CA | 2372451 | 8/2003 |
| CN | 1165063 | 11/1997 |
| CN | 2691757 | 4/2005 |

(Continued)

*Primary Examiner* — Phong H Nguyen
(74) *Attorney, Agent, or Firm* — Antonelli, Terry, Stout & Kraus, LLP.

(57) ABSTRACT

A miter saw includes a base section having a front side and a rear side defining a first direction, and having a right side and a left side those defining a second direction. A holder is movably supported to the rear side of the base section and pivotable in the second direction. A fixing mechanism fixes a pivot position of the holder relative to the base section. A guide bar section includes two guide bars supported to the holder and extending in the first direction. A saw blade support section is disposed slidable with respect to the guide bars and selectively position-fixable with respect to the guide bars. A saw blade section which is pivotably supported accommodates a motor and rotatably supports a circular saw blade driven by the motor.

9 Claims, 5 Drawing Sheets

FOREIGN PATENT DOCUMENTS

| | | |
|---|---|---|
| DE | 20 2004 004 929 | 7/2004 |
| EP | 0 502 350 | 9/1992 |
| GB | 2 304 076 | 3/1997 |
| JP | 62-11526 U | 1/1987 |
| JP | 11-090730 | 4/1999 |
| JP | 2001-300902 | 10/2001 |

* cited by examiner

MITER SAW HAVING CIRCULAR SAW BLADE SECTION PIVOTALLY MOVABLE UPWARD AND DOWNWARD AND TILTABLE LEFTWARD AND RIGHTWARD

BACKGROUND OF THE INVENTION

The present invention relates to a miter saw having a circular saw blade section pivotable about a first axis extending in a direction parallel with a rotation axis of the circular saw blade, and pivotally movable about a second axis extending horizontally and in a direction perpendicular to the rotation axis.

Japanese Utility Model application Publication No. S62-11526 discloses a miter saw including a base section, a holder extending from a rear portion of the base section, a slide bar slidably supported to the holder, a saw blade support section supported to the slide bar, and a saw blade section pivotally movably supported to the saw blade support section. The saw blade section includes a circular saw blade and a motor for rotating the blade. The holder is pivotally movable in a lateral direction for changing and angle of a side surface of the circular saw blade relative to an upper surface of the base section.

In the conventional miter saw, entirety of the miter saws become compact in size when the saw blade section is positioned frontwardly, i.e., away from the holder. This facilitates transportation of the miter saw. However, if the saw blade section is moved rearward, the slide bar largely protrudes rearwardly from the holder. Therefore, a large installation space is required between a wall and a rearmost end of the slide bar for allowing the slide bar to be moved to its rearmost position to perform cutting operation for cutting an elongated workpiece.

Japanese Patent Application Publication No. H11-90730 discloses a miter saw including a base section, guide bar extending from a rear portion of the base section and supported to the base section and slidably movable in a frontward/rearward direction, a holder supported to the guide bar and pivotally movable in a lateral direction, and a saw blade section pivotally movably supported to the holder.

In the conventional miter saw, entirety of the miter saws become compact in size when the saw blade section is positioned frontwardly, i.e., the guide bar is retracted into the base section. This facilitates transportation of the miter saw. However, in these conventional miter saws, if the saw blade section is moved rearwardly, the holder is also moved rearward away from the base section. Therefore, a large installation space is required between a wall and a rearmost end of the holder for allowing the saw blade section to be moved to its rearmost position to perform cutting operation for cutting an elongated workpiece.

Further, in both conventional miter saws, large load extending perpendicular to the sliding direction of the slide bar or the guide bar is imparted on receiving portions slidably receiving the slide bar or the guide bar. This degrade slidability. Additional components must be required or a low frictional material must be selected to improve sliding performance, which is costly.

SUMMARY OF THE INVENTION

It is an object of the present invention to overcome the above-described problem and to provide a compact miter saw requiring a reduced working space with high operability.

This and other objects of the present invention will be attained by a miter saw including a base section, a guide bar support section, a fixing mechanism, a guide bar section, a saw blade support section, and a saw blade section. A workpiece to be cut is held on the base section. The base section has a front side and a rear side those defining a first direction and has a right side and a left side those defining a second direction perpendicular to the first direction. The guide bar support section is movably supported to the rear side of the base section and pivotable in the second direction. The fixing mechanism fixes a pivot position of the guide bar support section relative to the base section. The guide bar section includes at least one guide bar supported to the guide bar support section and extending in the first direction. The saw blade support section is disposed slidable with respect to the at least one guide bar and selectively position-fixable with respect to the at least one guide bar. A saw blade section accommodates a motor and rotatably supports a circular saw blade driven by the motor. The saw blade section is pivotally supported to the saw blade support section and is movable toward and away from the base section. The saw blade section is movable in the first direction upon movement of the saw blade support section relative to the at least one guide bar.

DETAILED DESCRIPTION OF THE PREFERRED EMBODIMENTS

A miter saw having a mechanism for laterally tilting a circular saw blade according to a first embodiment of the present invention will be described with reference to FIGS. 1 through 9. Unless otherwise noted, orientation terms, such as left, right, front, rear, up, and down, are used with respect to the normal orientation of the device for normal use.

Figure 1:
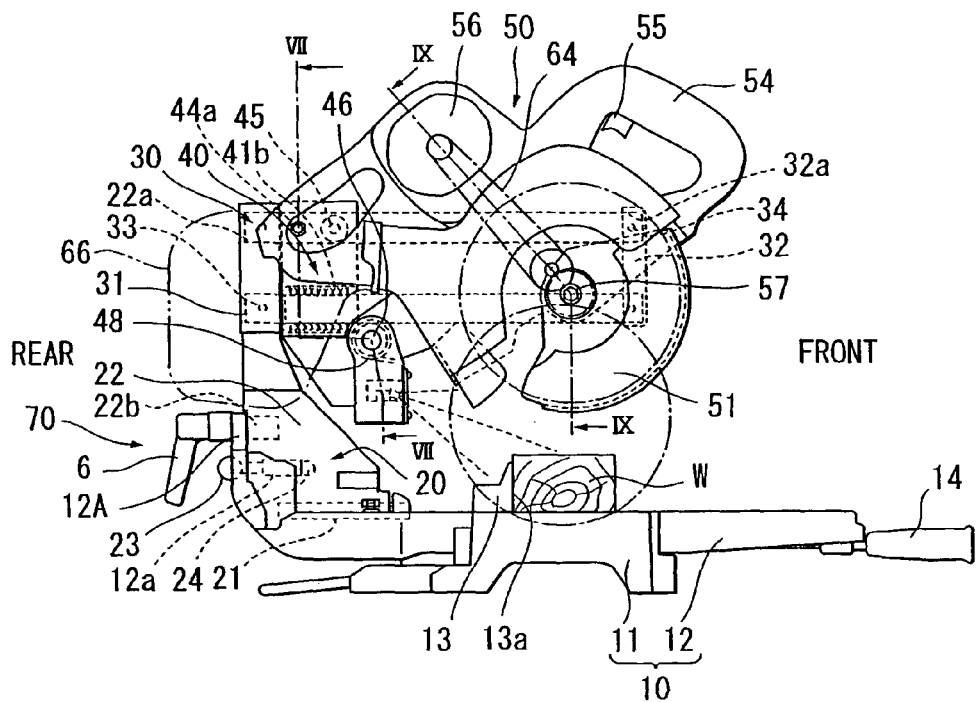
FIG. 1 is a side view of a miter saw with a laterally tiltable saw blade section according to a first embodiment of the present invention, and showing a state where the circular saw blade section is positioned at its rearmost and its uppermost position.
Figure 2:
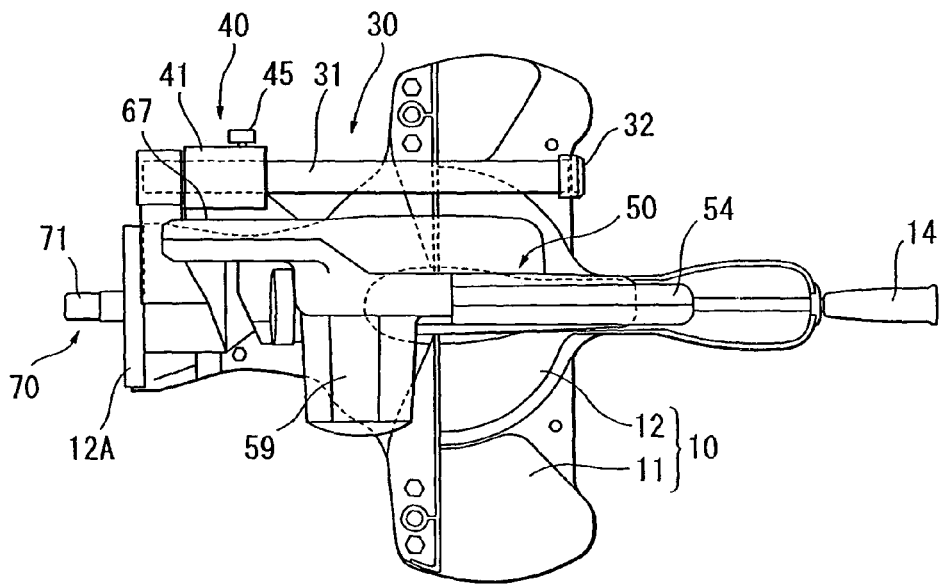
FIG. 2 is a plan view of the miter saw of FIG. 1.
Figure 3:
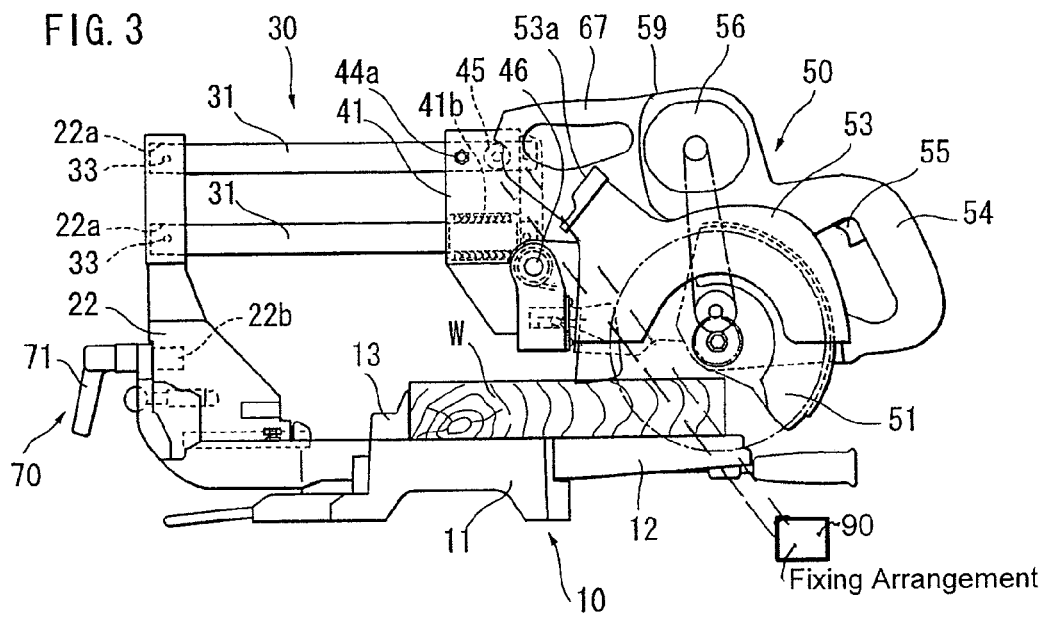
FIG. 3 is a side view of the miter saw according to the first embodiment, and showing a state where the saw blade section is positioned at its frontmost and its lowermost position.
Figure 4:
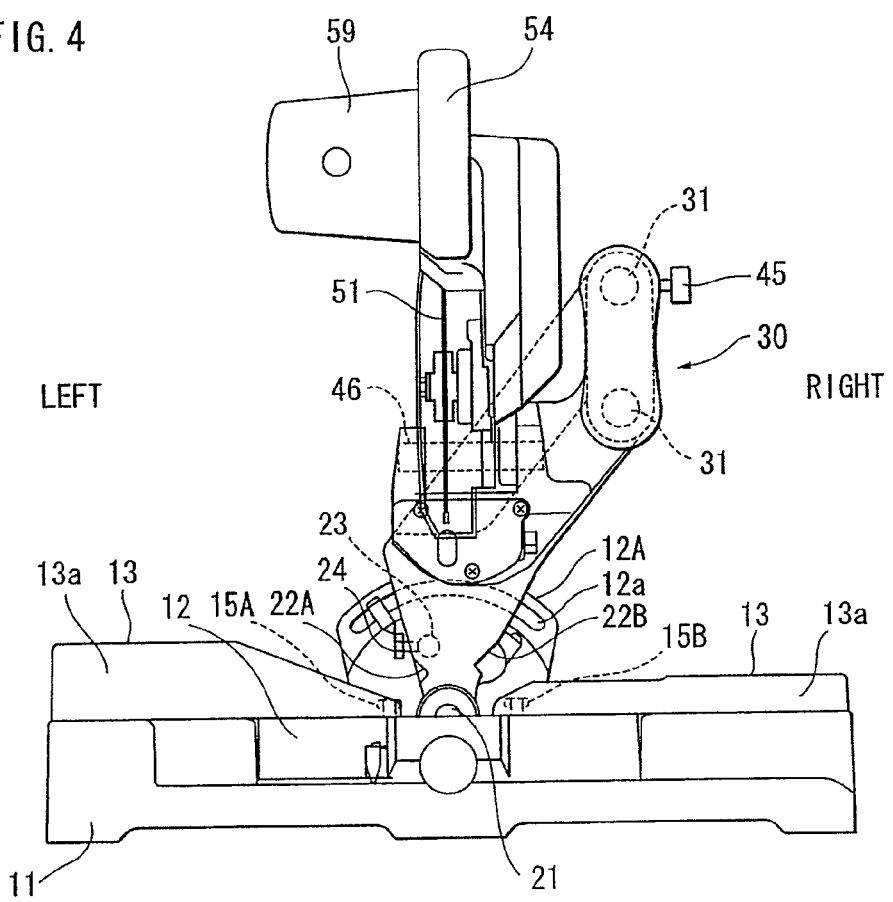
FIG. 4 is a front view of the miter saw and particularly showing a vertical orientation of a guide bar support section and the saw blade section.
Figure 5:
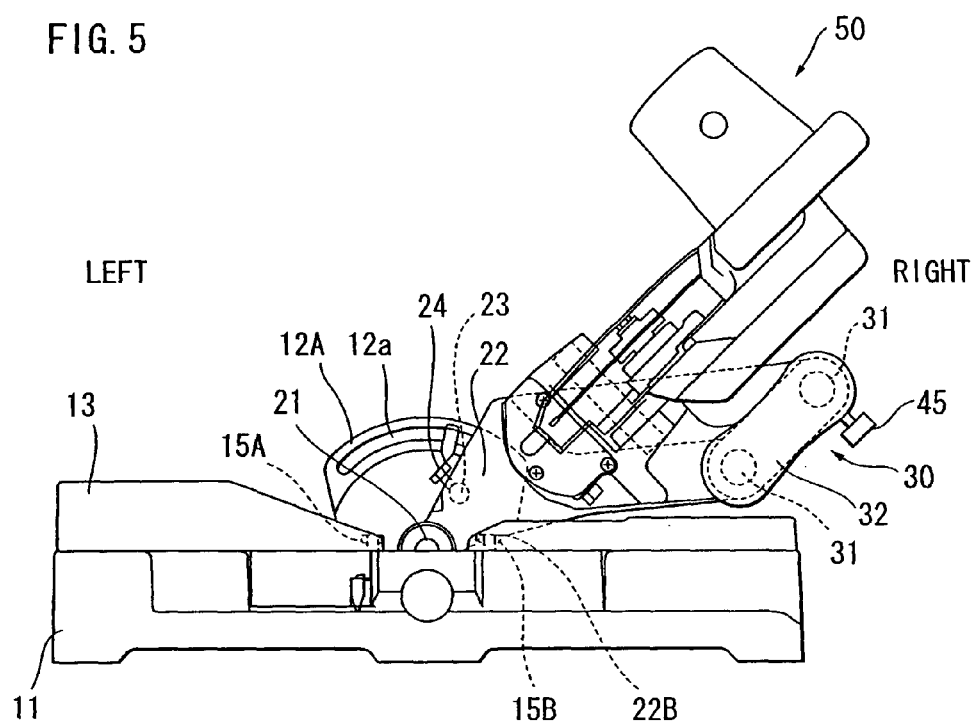
FIG. 5 is a front view of the miter saw and particularly showing a rightward tilting state of the guide bar support section and the saw blade section.
Figure 6:
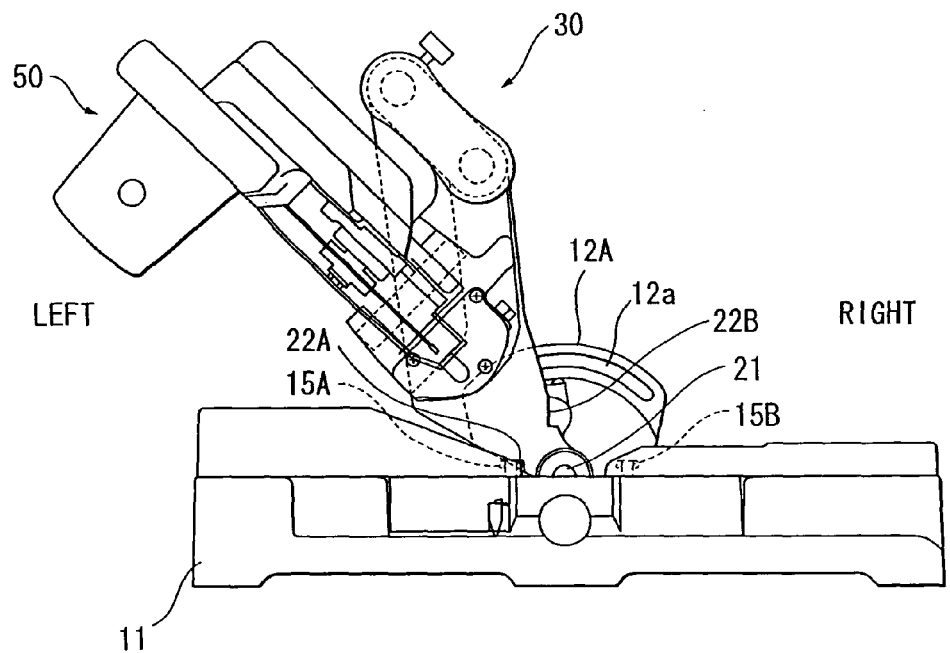
FIG. 6 is a front view of the miter saw and particularly showing a leftward tilting state of the guide bar support section and the saw blade section.

As shown in FIGS. 1 through 3, a miter saw 1 generally includes a base section 10, a guide bar support section 20, a guide bar section 30, a saw blade support section 40, and a saw blade section 50. The base section 10 is adapted for mounting thereon a workpiece W to be cut. The guide bar support section 20 extends upwardly from the base section and is pivotally supported to the base section and tiltable laterally as shown in FIGS. 4 through 6. The guide bar section 30 is supported to the guide bar support section 20 and extends in a horizontal and frontward/rearward direction. In the depicted embodiment, the guide bar section 30 is fixed to the guide bar support section 20. The saw blade support section 40 is supported on the guide bar support section 20 and movable between its rearmost position shown in FIG. 1 and a frontmost position shown in FIG. 3. The saw blade section 50 is pivotally supported to the saw blade support section 40 and movable between its uppermost pivot position shown in FIG. 1 and its lowermost pivot position shown in FIG. 3.

1. Base Section 10

The base section 10 includes a base 11 to be mounted on a floor or a table, and a turntable 12 rotatable on the base 11 in a horizontal plane. An upper surface of the turntable 12 is flush with an upper surface of the base 11. The workpiece W such as a wood is mounted on the base 11 and the turntable 12. A pair of fences 13 extends in line in a lateral direction (rightward/leftward direction) and protrude from the upper surface of the base 11 for positioning the workpiece W by abutting a vertical surface of the workpiece W with vertical abutment surfaces 13a of the fences 13. A blade entry plate formed with a groove (not shown) is fixed to a center portion of the upper surface of the turntable 12. The blade entry plate is adapted for preventing a cut surface of the workpiece W from being nappy or fluffy by permitting a lowermost blade tip of a circular saw blade 51 (described later) to be entered into the groove when the lowermost blade tip is positioned lower than the upper surface of the turntable. The turntable 12 has a rearmost upstanding portion 12A. A knob 14 is disposed at the front side of the turntable 12 for angularly rotating the turntable 12 about its axis and for fixing the angular rotational position of the turntable 12 relative to the base 11. At a rear portion of the turntable 12 and near the rearmost upstanding portion 12A, a through-hole 12a extending in frontward/rearward direction is formed.

2. Guide Bar Support Section 20

The guide bar support section 20 is pivotally movably supported to a rear end portion of the turntable 12. Therefore, by the rotation of the turntable 12 relative to the base 11, positions of the guide bar support section 20, the guide bar section 30, the saw blade support section 40 and the saw blade section 50 relative to the fences 13 is changed. Thus, an angle between the abutment surface 13a and a circular side surface of the circular saw blade 51 is changed. Accordingly, the workpiece W can be cut at a desired angle relative to the frontward/rearward direction (angled cutting).

The guide bar support section 20 generally includes a holder shaft 21, a holder 22, and a holder fixing mechanism 70 described later. The holder shaft 21 extends in the frontward/rearward direction at a rear side of the turntable 12. The holder shaft 21 has an axis positioned substantially coincident with the upper surface of the turntable 12. The holder 22 has a lower end portion pivotally movably supported on the holder shaft 21. Therefore, the holder 22 is laterally movable with respect to the turntable 12 about the holder shaft 21. The holder 22 has an upper portion to which the guide bar section 30 is fixed.

As shown in FIGS. 4 through 6, stop portions 22A and 22B are formed at lateral end faces of the holder 22 for regulating a laterally tilting angle of the holder 22. Further, stop bolts 15A, 15B vertically extend from the upper rear surface of the turntable 12 at position on a locus of the stop portions 22A, 22B. The stop bolts 15A, 15B are threaded into the turntable 22B. If the holder 22 is tilted in the lateral direction, the stop portion 22A or 22B is brought into abutment with the head of the stop bolt 15A or 15B, whereupon the tilting angle of the holder 22 can be set. Ordinarily, the stop bolts 15A, 15B are provided to laterally tilt the holder 22 at an angle of 45 degrees upon abutment with the stop portion 15A, 15B.

A pin 23 extends through the through-hole 12a of the turntable 12 and is movable between frontmost and rearmost positions for regulating the vertical orientation of the holder 22. A stop bolt 24 horizontally extends through the holder 22. A tip end of the stop bolt 24 is positioned abuttable on an outer peripheral surface of the pin 23 when the pin 23 is positioned at its frontmost position and when the holder 22 is at its vertical position. The tip end of the stop bolt 24 is positioned offset from the outer peripheral surface of the pin 23 when the pin 23 is displaced to its rearmost position. The holder fixing mechanism 70 is adapted for fixing a laterally tilting angle of the holder 22. Details of the holder fixing mechanism 70 will be described later. Upon fixing the pivot angle of the holder 22, the tilting angle of the circular saw blade 51 is fixed, thereby performing slant cutting.

3. Guide Bar Section 30

As shown in FIGS. 2 through 4, the upper end portion of the holder 22 is positioned laterally displaced from the lateral center C of the base section 10, and is formed with a pair of bores 22a, 22a extending in parallel with the side surface of the circular saw blade 51 as shown in FIG. 2 and in parallel with the upper surface of the base 11 as shown in FIG. 3. When the holder 22 is at its vertical posture shown in FIG. 4, the pair of bores 22a, 22a are arrayed in a vertical plane as shown in FIG. 4.

The guide bar section 30 generally includes a pair of guide bars 31, 31 and an front end cap 32. The guide bars 31 have lengths equal to each other and shorter than a longitudinal length of the turntable 12 (the longitudinal length extends in the frontward/rearward direction). The guide bars 31 have tubular shape and have circular cross-section whose outer diameter is substantially equal to an inner diameters of the pair of bores 22a, 22a. The guide bars 31 provide sufficient rigidity.

Each rear end of each guide bar 31 is inserted into each bore 22a. In order to avoid accidental release of the guide bars 31 from the bores 22a or to avoid accidental rotation of the guide bars 31 about their axes within the bores 22a, a pair of female threads in communication with the respective bores 22a are formed in the holder 22 in a radial direction of the guide bar 31, and fixing bolts 33 are threadingly engaged with the corresponding female threads, so that tip ends of the fixing bolts 33 can press against the outer peripheral surfaces of the guide bars 31. Thus, the guide bars 31 extend in parallel with the side surface of the circular saw blade 51 as shown in FIG. 2 and in parallel with the upper surface of the base 11 as shown in FIG. 4. When the holder 22 is at its vertical posture shown in FIG. 4, the guide bars 31 are arrayed in a vertical plane as shown in FIG. 4. Alternatively, the outer diameter of the guide bars 31 is slightly greater than the inner diameters of the pair of bores 22a, 22a. In the latter case, the guide bars 31 are force-fitted with the bores 22a, and the fixing bolts 33 can be dispensed with.

Each front end of the guide bar 31 is fixed to the front end cap 32. To this effect, the front end cap 32 is formed with a pair of bores 32a, 32a extending in parallel with each other and having inner diameter substantially equal to the outer diameter of the guide bar 31. Further, a pair of female threads in communication with the respective bores 32a are formed in the end cap 32 in a radial direction of the guide bar 31, and fixing bolts 34 are threadingly engaged with the corresponding female threads, so that tip ends of the fixing bolts 34 can press against the outer peripheral surfaces of the front end portion of the guide bars 31. Thus, rotation of the guide bars 31 relative to the front end cap 32 is prevented, and the front end cap 32 is fixedly secured to each front end of the guide bar 31. Thus rear ends and front ends of the guide bars 31 are fixed to the holder 22, and the front end cap 23, respectively.

4. Saw Blade Support Section 40

The saw blade support section 40 is adapted to pivotally movably support the saw blade section 50, and is movable relative to the guide bars 31 between a rearmost position defined by the holder 22 and a frontmost position defined by the front end cap 32. Further, the saw blade support section 40 can be selectively fixed to the guide bars 31.

Figure 7:
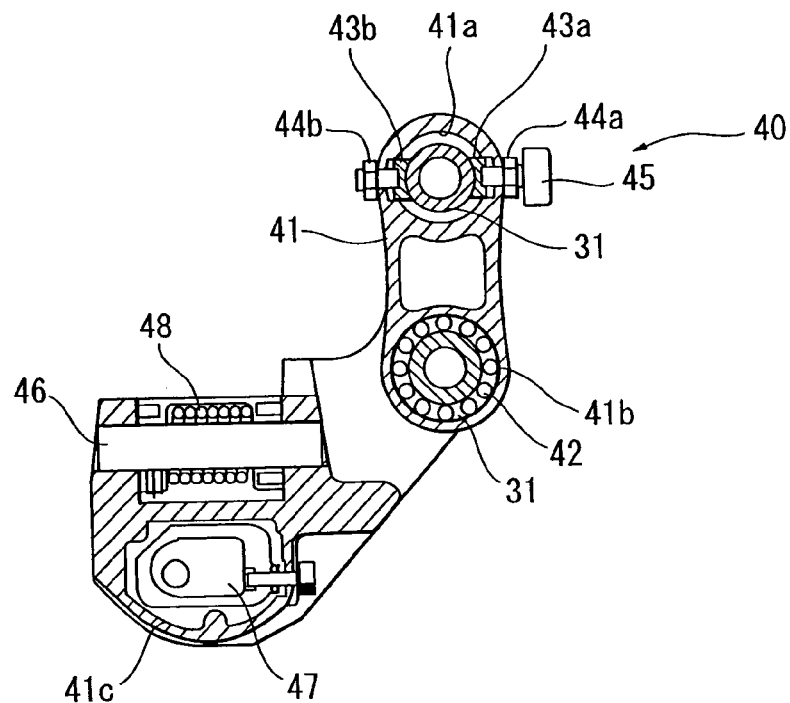
FIG. 7 is a cross-sectional view taken along the line VII-VII in FIG. 1 for particularly showing a saw blade support section.

The saw blade support section 40 includes a support segment 41 slidably movable between the holder 22 and the front end cap 32. The saw blade section 50 is movably supported on the support segment 41. More specifically, as shown in FIG. 7, the support segment 41 is formed with an upper bore 41a and a lower bore 41b through which the upper guide bar 31 and the lower guide bar 31 extend, respectively. The upper bore 41a is substantially concentric with the upper guide bar 31 and has an inner diameter greater than the outer diameter of the upper guide bar 31. The lower bore 41b is substantially concentric with the lower guide bar 31 and has an inner diameter greater than the outer diameter of the lower guide bar 31.

As shown in FIG. 7, a ball bearing 42 is disposed in the lower bore 41b. The ball bearing 42 has an inner diameter approximately equal to the outer diameter of the lower guide bar 31, and has an outer peripheral surface in sliding contact with the lower bore 41b. The lower bore 41b has an axial length approximately equal to an axial length of the ball bearing 42. This axial length is the minimum length for maintaining sufficient sliding performance of the support segment 41 relative to the guide bars 31.

Two sliding segments 43a, 43b are disposed in the upper bore 41a and in sliding contact with the outer peripheral surface of the upper guide bar 31. Bolts 44a, 44b extend in radial direction of the upper guide bar 31 and are threadingly engaged with the support segment 41. The bolts 44a, 44b have inner ends supporting the sliding segments 42a, 43b. Thus, the sliding segments 43a, 43b are movable in the radial direction of the upper guide bar 31 by the axial movement of the bolts 44a, 44b caused by the threading engagement. A knob 45 is threadingly engaged with the support segment 41 and is engageable with the upper guide bar 31. By fastening the knob 45, the movement of the support segment 41 relative to the upper guide bar 31 can be stopped.

In FIG. 7, by controlling the axial positions of the bolts 44a and 44b caused by the threading advancement or retraction thereof, the positions of the two sliding segments 43a, 43b can be changed. Thus, relative position between the support segment 41 and the upper guide bar 31 can be changed. That is, a minute pivotal movement of the support segment 41 about an axis of the lower guide bar 31 can be performed. To be more specific, in FIG. 7, by moving the two sliding segments 43a, 43b leftwardly, the left end of the upper guide bore 31 is moved toward the upper bore 41a, i.e., the support segment 41 is pivotally and finely moved in a clockwise direction in FIG. 7 about the axis of the lower guide bar 31. Consequently, the saw blade section 50 and its circular saw blade 51 are also povitally moved about the axis of the lower guide bar 31. Thus, an angle of a side surface of the circular saw blade 51 relative to the upper surface of the base 11 can be finely controlled. The construction shown in FIG. 7 can reduce a size of the support segment 41 to provide a compact miter saw while maintaining the sufficient movement of the saw blade section 50 relative to the guide bar section 30.

The rearmost position of the saw blade support section 40 is defined by the abutment of the support segment 41 onto the holder 22, and the frontmost position of the saw blade support section 40 is defined by the abutment of the support segment 41 onto the front end cap 32. Moreover, the disengagement of the support segment 41 from the guide bars 31 can be prevented by the front end cap 32. Incidentally, since only the support segment 41 supporting the saw blade section 50 is slidingly moved on the guide bars 31, only a small amount of load is imparted on the ball bearing 42 in a direction perpendicular to the sliding direction. Further, the load is constant regardless of the sliding position of the support segment 41 relative to the guide bars 31. Accordingly, a compact ball bearing 42 is available.

As shown in FIG. 7, a pivot shaft 46 laterally extends through the support segment 41 in a direction perpendicular to the axial direction of the guide bars 31. The saw blade section 50 is pivotally movable about an axis of the pivot shaft 46. A recess 41c is formed in the support segment 41 at a position below the pivot shaft 46. A laser oscillator 47 is disposed in the recess 41c. The laser oscillator 47 is movable within the recess 41c at least in the axial direction of the circular saw blade 51, so that the laser beam can extends along the side surface of the circular saw blade 51. Thus, a cutting line which is an extension of the side surface can be irradiated onto the workpiece W to be cut. This facilitates recognition of the position of the circular saw blade 51 prior to cutting, thereby enhancing operability.

Within the recess 41c, a spring 48 is disposed. The spring 48 is disposed over the pivot shaft 46 and has one end acting on the support segment 41 and another end acting on the saw blade section 50 for normally urging the saw blade section 50 to be pivotally moved away from the upper surface of the base 11 about the axis of the pivot shaft 46. A stop mechanism (not shown) is provided for maintaining the saw blade section 50 at its uppermost position during non-operating state. For the cutting operation, the saw blade section 50 is pivotally moved downwardly against the biasing force of the spring 48.

As described above, the guide bars 31 are not protrudingly moved rearwardly from the holder 22 during cutting, and the holder 22 does not move away from the base section 10 in frontward/rearward direction during cutting. Therefore, entire miter saw 1 becomes compact even during cutting operation. Thus, cutting work can be performed in a narrow space. In other words, it is unnecessary to provide a surplus space between an ambient wall and the rearmost end of the miter saw 1.

5. Saw Blade Section 50

Figure 8:
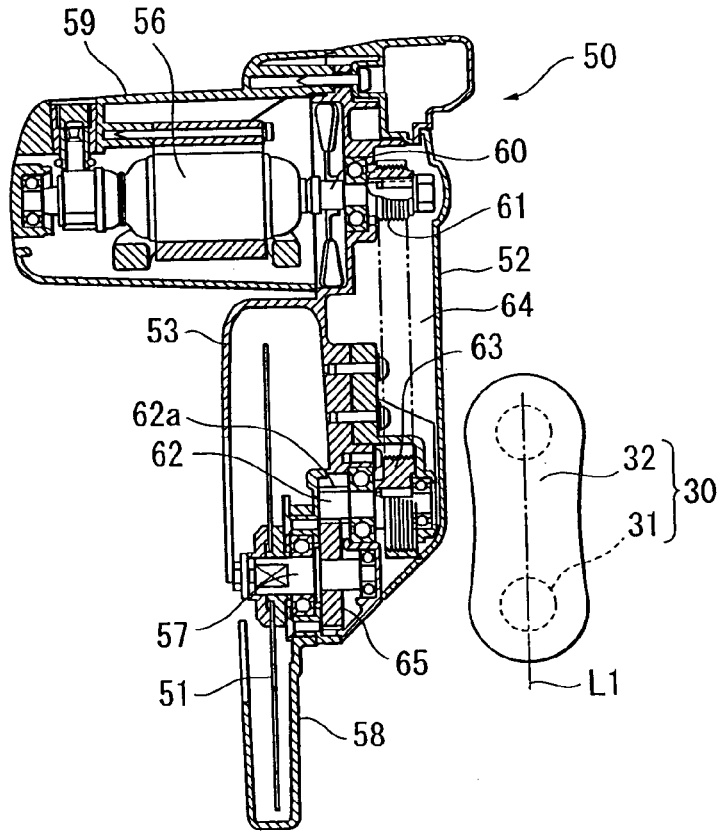
FIG. 8 is a cross-sectional view taken along the line IX-IX of FIG. 1 for particularly showing the saw blade section.

The saw blade section 50 includes a gear case 52 pivotally movably supported to the support segment 41 through the pivot shaft 46. As shown in FIG. 8, a saw blade cover 53 is provided integrally with the gear case 52 for covering an upper half of the circular saw blade 51. The saw blade cover 53 is formed with a cutting chip discharge port 53a (FIG. 3) open toward the holder 22. A dust collection bag 66 (FIG. 1) can be attached to the discharge port 53a. Alternatively, a hose (not shown) of a vacuum device can be attached to the discharge port 53a for preventing the cutting chip from scattering.

Incidentally, dust collection bag 66 has its rearmost end positioned frontwardly of a rearmost component of the miter saw 1. (In FIG. 1, the rearmost component is a clamp lever 71 described later). With this arrangement, the effective dust collection can be performed even if a wall or ambient object exists immediately near at the rear side of the holder 22. Such arrangement can be realized by designing a size of the dust collection bag 66 or by inclining orientation of the discharge port 53a relative to the side surface of the circular saw blade 51. As a result, the dust collection bag 66 does not affect the installation space for the miter saw 1.

A saw blade shaft 57 is rotatably supported on the gear case 52. The circular saw blade 51 is coaxially mounted on the saw blade shaft 57. A safety cover 58 is pivotally supported to the gear cover 52 for protectively covering a portion of the circular saw blade 51 projecting out of the saw blade cover 53. The safety cover 58 is adapted to cover the projecting out portion of the circular saw blade 51 when the saw blade section 50 is at the upper pivot position shown in FIG. 1, and to expose the projecting out portion to the atmosphere when the saw blade section 50 is at the lower pivot position shown in FIG. 3. To this effect, a link mechanism (not shown) is provided for pivotally retracting the safety cover 58 into the saw blade cover 53.

A motor housing 59 is fixed to the gear cover 52. The motor housing 59 houses therein the motor 56 which has a motor shaft 60 extending in parallel with the saw blade shaft 57 and supported rotatably on the gear case 52. The motor 56 is positioned such that an imaginary plane containing the side surface of the circular saw blade 51 intersects a part of the motor 56. Further, a handle 54 is provided integrally with the motor housing 59 so as to form a part of the motor housing 59. The handle 54 is located on an imaginary plane containing the side surface of the circular saw blade 51. With this arrangement, reaction force imparted on the saw blade section 50 through the circular saw blade 51 during cutting can be properly received by the handle 54. In other words, reaction force from the circular saw blade 51 is linearly transmitted to the handle 54 without any deviation. A switch 55 is provided to the handle 54 for driving a motor 56.

A sub-handle 67 is provided integrally with the motor housing 59 so as to form a part of the motor housing 59. The sub-handle 67 extends in a direction parallel with the guide bars 31 when the saw blade section 51 is pivotaly moved to its most downward position as shown in FIG. 3. The motor housing 59 having the integral handle 54 and the integral sub-handle 67 forming part thereof is provided with a fixing arrangement 90, as shown in FIG. 3, for fixing the lowermost pivot posture of the saw blade section 50 relative to the support segment 41. Upon fixing the lowermost pivot position, the user can easily carry the miter saw 1 by gripping the sub-handle 67.

A power transmission mechanism is provided in the gear case 52 for transmitting the rotation of the motor shaft 60 to the saw blade shaft 57. The transmission mechanism includes a motor shaft pulley 61, an intermediate shaft 62, an intermediate shaft pulley 63, an endless belt 64, a pinion 62a, and a gear 65. The motor shaft pulley 61 is fixed to a tip end of the motor shaft 60 at which a fan is fixed. The intermediate shaft 62 is positioned close to and in parallel with the saw blade shaft 57 and is rotatably supported on the gear case 52. The intermediate shaft pulley 63 is integrally rotatable with the intermediate shaft 62 and is disposed at a side opposite to the circular saw blade 51. The endless belt 64 is mounted on the motor shaft pulley 61 and the intermediate shaft pulley 63.

The pinion 62a is formed at an outer peripheral surface of the intermediate shaft 62 and at a side opposite to the intermediate shaft pulley 63. The pinion 62a is positioned closest to the circular saw blade 51 among the components on the intermediate shaft 62. The gear 65 is force-fitted with the saw blade shaft 57. As a result, the gear 65 is rotatable together with the rotation of the saw blade shaft 57 and in alignment with the pinion 62a for meshing engagement therewith.

As shown in FIGS. 4 and 8, the upper and lower guide bars 31, 31 are arrayed in a direction parallel with the side surface of the circular saw blade 51. That is, an imaginary line L1 connecting axes of the upper and lower guide bars 31,31 extends in parallel with the side surface of the circular saw blade 51. With this arrangement, rigidity of the sliding segments 43a, 43b and rigidity of the bores 22a of the holder 22 can be maintained when the saw blade section 50 is pivotally moved downwardly and when the miter saw 1 is hand-carried while gripping the sub-handle 67.

As shown in FIG. 1, the saw blade shaft 57 is positioned close to the guide bars 31, 31 when the saw blade section 50 is at the uppermost pivot position. Therefore, the guide bars 31,31 do not become significant factor or bar for downsizing the entire miter saw 1. Moreover, since a distance between the handle 54 and the circular saw blade 51 in the axial direction of the saw blade shaft 57 is extremely small, the saw blade support section 40 carrying the saw blade section 50 can smoothly slides on the guide bars 31, 31 when the saw blade section 50 is maintained at its most downward posture for cutting the workpiece W having an elongated length in the frontward/rearward direction of the miter saw 1. Furthermore, because of the above-described geometrical relationship between the motor 56 and the side surface of the circular saw blade 51 and because of the geometrical relationship in the power transmission mechanism including the endless belt 64, entire width of the saw blade section in the axial direction of the circular saw blade 51 can be reduced. Accordingly, the guide bar support section 20 and the saw blade section 50 can be tilted up to 45 degrees even toward a side where the guide bars 31 exist as shown in FIG. 5. Of course the guide bar support section 20 and the saw blade section 50 can be tilted up to 45 degrees leftwardly as shown in FIG. 6. Further, since the motor shaft 60 and the saw blade shaft 57 extend in parallel with each other, a height of the saw blade section 50 can be reduced thereby reducing an entire height of the miter saw 1.

6. Holder Fixing Mechanism 70

The holder fixing mechanism 70 will next be described with reference to FIGS. 1 through 6. The holder fixing mechanism 70 is adapted to fix the holder 22 to the base section 10 so as to fix the pivot position of the holder 22 about an axis of the holder shaft 21 in order to fix the inclination angle of the side surface of the circular saw blade 51 relative to the upper surface of the base 11 and the turntable 12.

As described above, the rearmost upstanding portion 12A protrudes vertically from the rear end portion of the turntable 12 and serves as a holder support for fixing a laterally tilting angle of the circular saw blade 51. The holder support 12A is formed with an arcuate slot 12a whose center of radius is coincident with the holder shaft 21. The arcuate slot 12a is at a position in alignment with a female thread hole 22b formed in the holder 22. A clamp lever 71 extends through the arcuate slot 12a. The clamp lever 71 has a tip end portion formed with a male thread portion threadingly engageble with the female thread hole 22b. Upon unfastening the clamp lever 71 to disengage the male thread portion from the female thread hole 22a, the holder 22 can be laterally tiltable about the holder shaft 21 within the length of the arcuate slot 12a. The arcuate slot 12a has a length capable of maximumly tilting the holder 22 at 45 angles in both rightward and leftward directions. If the clamp lever 71 is fastened while the holder 22 is tilted at a desired angle, the holder 22 can be fixed to the holder support 12A at the desirable tilting angle.

For laterally tilting the saw blade section 50, the clamp lever 71 is unfastened for releasing the holder 22. By this unclamping, the holder 22 is freely pivotally movable relative to the turntable 12 about the axis of the holder shaft 21. As a result, the holder 22 can be tilted rightwardly or leftwardly. Then, the clamping is again performed while the user holds the saw blade section 50 at its desired pivot posture. That is, while the user maintains a desired pivot posture of the saw blade section 50 with his one hand, the user clamps the clamp lever 71 with his remaining hand. If the holder 22 is tilted rightwardly, the stop portion 22B (FIG. 5) is brought into abutment with the stop bolt 15B, so that the tilting angle of the saw blade section 50 is set at 45 degrees. With this posture, the clamp lever 71 is fastened to fix the tilting position of the holder 22. The same is true with respect to the leftward tilting of the holder 22 while using the stop portion 22A and the stop bolt 15A.

For laterally tilting the saw blade section 50, the holder 22 is tilted rightwardly or leftwardly. In this case, because the center of the gravity of the motor 56 is in vertical alignment with the holder shaft 21 when the holder 22 is in vertical orientation, the saw blade section 50 can be tilted with constant force regardless of the tilting direction.

For cutting the workpiece W, the motor 56 is energized upon pressing the switch 55 for rotating the motor shaft 60, whereupon the circular saw blade 51 is rotated through the pulley 52, the transmission belt 64, the intermediate shaft pulley 63 and the saw blade shaft 57. While maintaining this state, an operator grips the handle 54 and pushes the saw blade section 50 downwardly against the biasing force of the spring 48. The circular saw blade 51 is entered into the groove of the blade entry plate in the turntable 12. Thus, the workpiece W can be cut. If cutting to the workpiece W is completed, the operator pulls up the handle 54, so that the saw blade section 50 can restore its original uppermost position by the biasing force of the spring 48.

For cutting an elongated workpiece W, after the saw blade section 50 is pivotally moved by a predetermined amount as shown in FIG. 3, the pivot motion can stopped by the stop mechanism (not shown). Thus, for cutting the workpiece having an elongated length in the frontward/rearward direction, the support segment 41 carrying the saw blade section 50 is provisionally moved to its frontmost position along the guide bars 31. Then, after the saw blade section 50 is pivoted downwardly, the saw blade section 50 is moved rearwardly along the guide bars 31 while claming the downward pivot position by the stop mechanism. In this case, the knob 45 is released.

For performing a vertical cutting in which the side surface of the circular saw blade 51 extends vertically, the clamp lever 71 is unfastened and the pin 23 is displaced frontwardly. Then, the holder 22 is pivotally moved toward its vertical posture. As a result, the pin 23 abuts the stop bolt 24 whereupon the vertical orientation of the circular saw blade 51 is established. Then, the clamp lever 71 is fastened in the above-described manner.

A workpiece having a wide area can be subjected to angled cutting and slant cutting as well as the above-described vertical cutting by moving the saw blade section 51 in the frontward/rearward direction. The angled cutting implies that the cutting line on the workpiece W is slanted with respect to the frontward/rearward direction. This angled cutting is achievable by angularly rotating the turntable 12 to change the geometrical relationship between the fences 13 and the side surface of the circular saw blade 51. The slant cutting implies that the cutting line in a thickness direction of the workpiece is slanted by controlling the pivot angle of the holder 22 relative to the turntable 12. To this effect, the knob 45 is loosened for facilitating sliding movement of the support segment 41 relative to the guide bars 31. In this way, composite cutting is achievable including vertical cutting, angled cutting and slant cutting.

A miter saw according to a second embodiment of the present invention will next be described with reference to FIGS. 9 and 10. The second embodiment pertains to a modification to the holder fixing mechanism 70 of the first embodiment. A holder fixing mechanism 170 in a miter saw 101 according to the second embodiment will be described.

The turntable 12 has a rearmost upstanding portion 112A whose upper end portion is configured into an arcuate shape protruding upwardly to form an engagement region 171. A holder 122 is provided with a protruding portion 172 including a horizontal section 172A protruding rearwardly from a rear surface 122a of the holder 122 and a vertical section 172B extending downwardly from the horizontal section 172A. Thus, a part of the engagement region 171 is surrounded by the rear surface 122a of the holder 122 and the protruding portion 172. Further, a locus of the protruding portion 172 in accordance with the pivotal motion of the holder 122 corresponds to the arcuate shape of the engagement region 171.

The vertical section 172B has an inward slant wall surface 172a inclined such that a distance between the slant wall surface 172a and the rear surface of the engagement region 171 is gradually increased toward the axis of the holder shaft 21. Further, a slider 173 is movably disposed between the engagement region 171 and the vertical section 172B. The slider 173 has a rear slant wall surface complementary with the slant wall surface 172a and in sliding contact therewith. The horizontal section 172A is formed with a through-hole 172b extending toward the axis of the holder shaft 21.

A clamp bolt 174 extends through the through-hole 172b and is rotatable about its axis. An inner diameter of the through-hole 172b is slightly greater than an outer diameter of the clamp bolt 174. The clamp bolt 174 has a tip end threadingly engaged with the slider 173. A spring 175 is disposed over the clamp bolt 174 and is interposed between the horizontal section 172A and the slider 173 for normally urging the slider 173 toward the holder shaft 21. By the rotation of the clamp bolt 174, the slider 173 is moved along an axis of the clamp bolt 174.

In other words, the locus of the slider 173 is positioned substantially along an imaginary plane which is an extension of the side surface of the circular saw blade 51 regardless of the pivotal posture of the saw blade section 50. Therefore, even if the holder 122 is slightly moved relative to the holder shaft 21 due to a minute clearance therebetween during the movement of the slider 173, the minute movement of the holder 122 relative to the holder shaft 21 is in alignment with the locus of the slider 173. Accordingly, the pivot angle of the saw blade section 50, i.e., the tilting angle of the circular saw blade 51, can be maintained regardless of the clearance.

Figure 9:
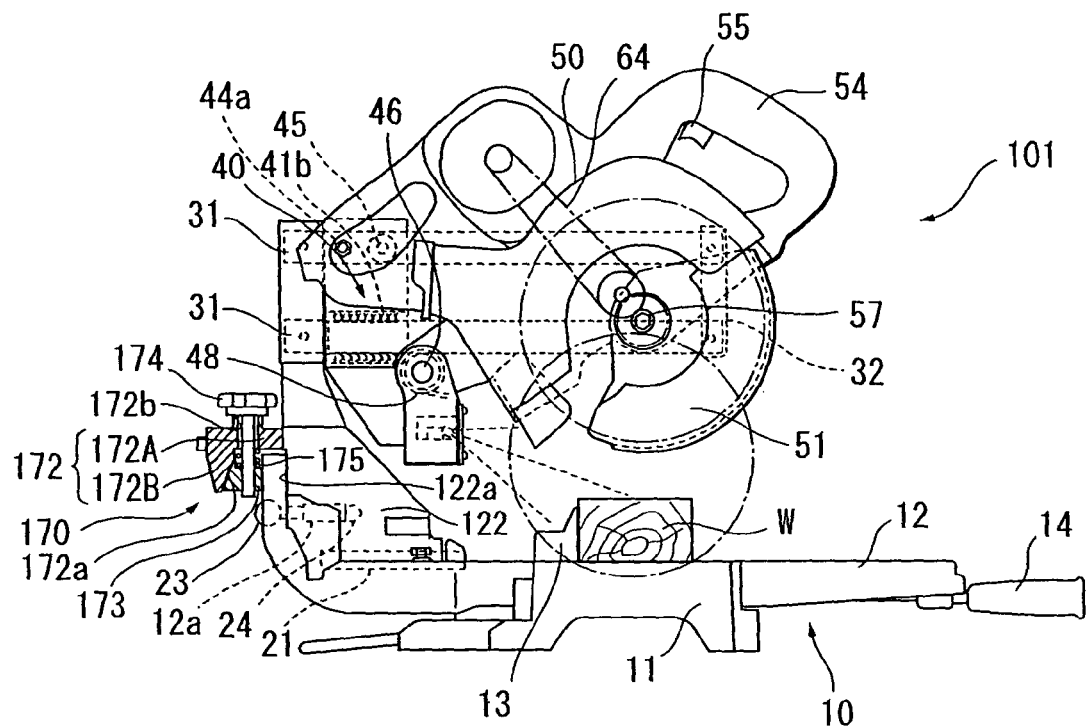
FIG. 9 is a side view of a miter saw with a laterally tiltable saw blade section according to a second embodiment of the present invention, and showing a state where the circular saw blade section is positioned at its rearmost and its uppermost position.
Figure 10:
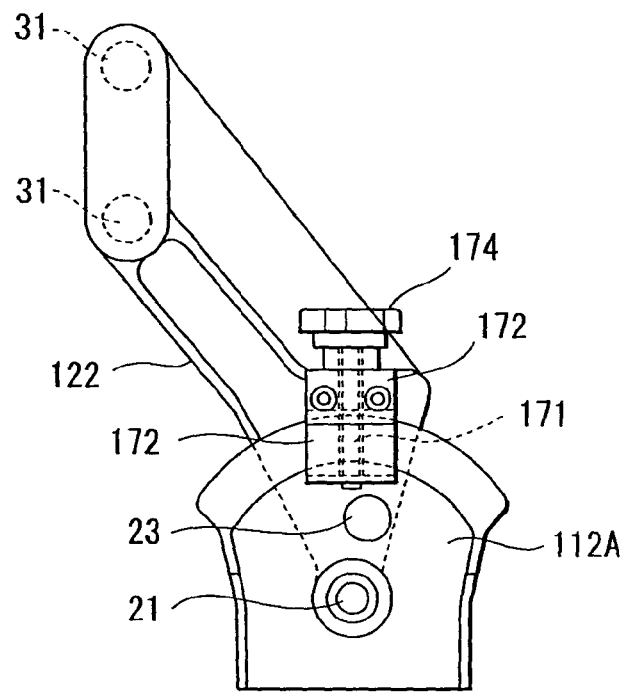
FIG. 10 is an enlarged view showing an essential portion of a holder fixing mechanism in the miter saw according to the second embodiment.

In a state shown in FIG. 9, the pivot position of the holder 122 relative to the turntable 12 is fixed. In this state, the slider 173 is at its uppermost position, so that the engagement region 171 of the turntable 12 is clamped between the rear surface 122a of the holder 122 and the slider 173. Thus, the holder 122 is immovable relative to the turntable 12. More specifically, the clamp bolt 174 is in its clamping state so that the slider 173 deeply thrusts into a space between the slant surface 172a and the rear surface of the rearmost upstanding portion 112A. Thus, the tapered surface of the slider 173 and the slant surface 172a of the protruding portion 172 is in intimate contact with each other, and the spring 175 is in its compressed state. In other words, the engagement region 171 is firmly nipped between the slider 173 and the holder 122 to prevent the holder 122 from free pivotal movement relative to the turntable 12. Thus, pivot position of the saw blade section 50 can be fixed.

For laterally tilting the saw blade section 50, the clamp bolt 174 is unfastened for releasing the holder 122. By this unclamping, the slider 173 is moved downward toward the holder shaft 21 by own weight of the slider 173 and expansion of the spring 175 in its axial direction. Thus, contacting force between the rear surface 122a of the holder 122 and the engagement region 171 of the turntable 12 is weakened, so that the holder 122 is freely pivotally movable relative to the turntable 12 about the axis of the holder shaft 21. As a result, the holder 122 can be tilted rightwardly or leftwardly. Then, the clamping is again performed while the user holds the saw blade section 50 at its desired pivot posture.

If the slider 173 relatively deeply thrusts the space between the engagement region 171 and the vertical section 172B as a result of excessive clamping, the slider 173 may not be moved toward the holder shaft 21 even by the own weight of the slider 173 and by the biasing force of the spring 175 as a result of unclamping the clamp bolt 174. In such case, the slider 173 can be moved toward the holder shaft 21 by simply pushing down the clamp bolt 174 after unclamping.

Clamping and unclamping to the holder 122 is performed mainly by a movement of the slider 173 in the axial direction of the clamp bolt 174. As described above, the slider 173 can be slightly moved toward the vertical section 172B due to the clearance between the outer diameter of the clamp bolt 174 and the inner diameter of the through-hole 172b. Further, a minute clearance may be provided between the rear surface 122a of the holder 122 and the engagement region 171. However, the engagement region 171 is tightly nipped between the rear surface 122a and the slider 173 so as to absorb these clearances as a result of minute movement of the holder 22 in the frontward/rearward direction.

Because the clamp bolt 174 extends toward the holder shaft 21, the manipulating portion of the clamp bolt 174 is easily accessible, even if the user or user's hand does not move to a position rearward of the holder fixing mechanism 170 or even if a wall or impediment exists nearby the rear side of the miter saw 101. Therefore, a work for fixing a desired pivot angle of the saw blade section 50 can be facilitated. Further, when installing the miter saw 101, it is unnecessary to provide a space between a wall and the rear side of the miter saw 101. Thus, an entire working space can be reduced. Further, since the clamp bolt 174 extends toward the holder shaft 21, entire length of the miter saw 101 in the frontward/rearward direction can be reduced.

Moreover, the perpendicular relationship between the axis of the clamp bolt 174 and the holder shaft 21 provides advantage in that the rotation of the clamp bolt 174 about its axis does not cause pivotal movement of the holder 122 about the holder shaft 21. This is in high contrast to a conventional arrangement in which a clamp lever extends in parallel with the holder shaft. In the latter case, the rotation of the clamp lever causes minute pivotal movement of the holder about the holder shaft, since the clamp lever is in direct contact with the holder during rotation of the clamp lever.

While the invention has been described in detail with reference to specific embodiments thereof, it would be apparent to those skilled in the art that various changes and modifications may be made therein without departing from the spirit and scope of the invention. For example, the numbers of the guide bars 31 is not limited to two, but one or three guide bars can be used.

Further, in the above-described embodiment, the saw blade section 50 can be pivotally moved rightward and leftward. However, a saw blade section pivotable only leftward or only rightward is also available.

Further, in the saw blade section 50 of the above-described embodiment, the power transmission mechanism is disposed at right side of the circular saw blade 51 in FIG. 8. However, the power transmission mechanism can be positioned at left side of the circular saw blade 51. Further, the turntable 12 can be dispensed with in the base section. Further, in FIG. 7, the bearing 42 can be provided at the upper bore 41a and the slide segments assemblies 43a, 43b 44a, 44b, 45 can be disposed in the lower bore 41b.

What is claimed is:

1. A miter saw comprising:
a base section having an upper surface on which a workpiece to be cut is held, the base section having a front side and a rear side defining a first direction and a right side and a left side defining a second direction perpendicular to the first direction;
a guide bar support section movably supported to the rear side of the base section, and pivotable in the second direction;
a fixing mechanism that fixes a pivot position of the guide bar support section relative to the base section;
a guide bar section comprising a first guide bar and a second guide bar fixed to the guide bar support section and extending substantially in parallel to each other in the first direction at a position above the upper surface of the base section, the first guide bar and the second guide bar extending so as to always be substantially parallel to the upper surface of the base section, the first guide bar being positioned higher than the second guide bar, and the first guide bar and the second guide bar defining axes which lie in a single imaginary plane which at least extends between the axes of the first and second guide bars;
a movable saw blade support section disposed slidable with respect to the first guide bar and the second guide bar and selectively position-fixable with respect to the first guide bar and the second guide bar;
a knob engageable with the movable saw blade support section and the first guide bar for stopping the movable saw blade support section at a selected position with respect to the first and second guide bars so as to provide selected position fixing of the movable saw blade support section thereat at a position above the base section;
a saw blade section that accommodates a motor and rotatably supports a circular saw blade driven by the motor, the saw blade section being pivotally supported to the movable saw blade support section and movable toward and away from the base section between an upper pivot position and a lower pivot position, the saw blade section having an uppermost end and being movable in the first direction upon movement of the movable saw blade support section relative to the first and second guide bars, the circular saw blade having side surfaces extending in the first direction, the motor being positioned with respect to one side surface of the circular saw blade and the first and second guide bars being positioned with respect to an opposite second side surface of the circular saw blade in the second direction; and
a fixing arrangement provided for fixing the lower pivot position of the saw blade section;

wherein the fixing arrangement fixes the saw blade section to the saw blade support section in the lower pivot position of the saw blade section at the selected fixed position of the movable saw blade support section on the first and second guide bars so as to enable carrying of the miter saw in the fixed lower pivot position of the saw blade section;

wherein the single imaginary plane extends in a direction parallel to the side surfaces of the circular saw blade at a position which is transverse to and spaced away from the side surfaces of the circular saw blade; and wherein the first and second guide bars are positioned lower than the uppermost end of the saw blade section regardless of the upper pivot position and the lower pivot position of the saw blade section, and the first and second guide bars are disposed so as to avoid contact with the base section even when the guide bar support section is pivotally moved in the second direction toward the base section at a pivot angle of 45 degrees.

2. The miter saw as claimed in claim 1, wherein the guide bar support section comprises a holder having a lower end portion supported to the base section, and the miter saw further comprising a holder shaft extending in the first direction and having an axis extending on an upper surface of the base section, the lower end portion being rotatably supported on the holder shaft.

3. The miter saw as claimed in claim 2, wherein the guide bar section comprises:

the first and second guide bars having rear ends fixed to the holder and having front ends; and a front end cap fixed to the front ends of the first and second guide bars, the movable saw blade support section providing a rearmost position upon abutment of the movable saw blade support section onto the holder and providing a frontmost position upon abutment of the movable saw blade support section onto the front end cap.

4. The miter saw as claimed in claim 2, wherein the saw blade section comprises:

a casing for rotatably supporting the circular saw blade, the casing being formed with a cutting chip discharge port; and a dust collection bag detachably attached to the cutting chip discharge port, the dust collection bag having a rearmost end positioned frontward of a rearmost component.

5. The miter saw as claimed in claim 1, wherein the movable saw blade support section comprises a movable support segment supporting the saw blade section, the first and second guide bars extending through the support segment; and wherein the miter saw further comprises a laser oscillator disposed at the support segment, the laser oscillator being positioned to irradiate a laser beam onto a workpiece, the laser beam passing along an imaginary plane containing the side surface of the circular saw blade.

6. The miter saw as claimed in claim 1, wherein the motor has a portion intersecting another imaginary plane containing at least one of the side surfaces of the circular saw blade, and the saw blade section further comprises a power transmission mechanism transmitting rotation of the motor to the circular saw blade.

7. The miter saw as claimed in claim 1, wherein the motor has a motor shaft, and wherein the circular saw blade has a rotation shaft extending substantially in parallel with the motor shaft.

8. The miter saw as claimed in claim 1, wherein the saw blade section further comprises a handle disposed at a position on another imaginary plane containing at least one of the side surfaces of the circular saw blade.

9. The miter saw as claimed in claim 8, wherein the saw blade section further comprises a sub-handle serving as an uppermost component of the saw blade section when the saw blade section is at its most downward pivot position.

* * * * *